United States Patent
Hayashi et al.

(10) Patent No.: US 7,043,839 B2
(45) Date of Patent: May 16, 2006

(54) METHOD AND APPARATUS FOR CHARGING OIL INTO FLUID-DYNAMIC-PRESSURE BEARINGS, SPINDLE MOTOR UTILIZING FLUID-DYNAMIC-PRESSURE BEARINGS, AND SIGNAL RECORD-AND-PLAYBACK DEVICE UTILIZING FLUID-DYNAMIC-PRESSURE BEARINGS

(75) Inventors: Hiroyuki Hayashi, Kyoto (JP); Tatsuya Yoshida, Kyoto (JP); Yuzo Suzuki, Kyoto (JP); Toshihiro Kimura, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/605,811

(22) Filed: Oct. 29, 2003

(65) Prior Publication Data
US 2004/0107577 A1    Jun. 10, 2004

(30) Foreign Application Priority Data

Oct. 31, 2002  (JP) .............................. 2002-319076
Sep. 25, 2003  (JP) .............................. 2003-333162

(51) Int. Cl.
*B21D 53/10*    (2006.01)

(52) U.S. Cl. ..................... 29/898.02; 29/724
(58) Field of Classification Search ............ 29/898.02, 29/724; 141/5, 8; 184/7.4
See application file for complete search history.

(56) References Cited

U.S. PATENT DOCUMENTS

| | | | | |
|---|---|---|---|---|
| 5,524,728 A | * | 6/1996 | Williams et al. | 184/29 |
| 5,862,841 A | * | 1/1999 | Wuester, Sr. | 141/284 |
| 6,733,180 B1 | * | 5/2004 | Nakamura | 384/100 |
| 2003/0221317 A1 | * | 12/2003 | Kaimi et al. | 29/898.02 |
| 2004/0256178 A1 | * | 12/2004 | Neumann et al. | 184/7.4 |
| 2005/0000092 A1 | * | 1/2005 | Misu et al. | 29/898.02 |
| 2005/0095159 A1 | * | 5/2005 | Sumi et al. | 418/1 |

FOREIGN PATENT DOCUMENTS

| | | | |
|---|---|---|---|
| JP | 08-270653 | * | 10/1996 |
| JP | 2002-05170 | * | 1/2002 |
| JP | 2002-168394 | * | 6/2002 |

* cited by examiner

*Primary Examiner*—Eric Compton
(74) *Attorney, Agent, or Firm*—James Judge

(57) ABSTRACT

Manufacturing method enabling optimal volume oil-fill even where differing from bearing to bearing due to machining fluctuations in volume-production dynamic pressure bearings. In a first charging method, injection of oil is divided into two cycles. The first is carried out under reduced pressure, following which the pressure is raised a predetermined amount to force the oil into the bearing gap. The oil-fill status is thereupon checked, the shortage is reckoned, and in the second cycle the shortage is injected. In a second charging method, in a first cycle a surplus volume is injected under reduced pressure and the pressure is raised a predetermined amount to force the oil into the bearing gap. Following that, what is in excess of the appropriate amount is removed from the bearing. The first cycle of injection and the pressure elevation may be implemented multiple times, in between which repeat pressure-reduction can be carried out.

12 Claims, 5 Drawing Sheets

METHOD AND APPARATUS FOR CHARGING OIL INTO FLUID-DYNAMIC-PRESSURE BEARINGS, SPINDLE MOTOR UTILIZING FLUID-DYNAMIC-PRESSURE BEARINGS, AND SIGNAL RECORD-AND-PLAYBACK DEVICE UTILIZING FLUID-DYNAMIC-PRESSURE BEARINGS

BACKGROUND OF INVENTION

1. Technical Field

The present invention relates to fluid-dynamic-pressure bearings employed in signal record-and-playback devices in hard-disk drives and like apparatus, and to methods and equipment for manufacturing such bearings.

2. Description of the Related Art

Various fluid-dynamic-pressure bearings have been used to date in spindle motors employed in signal record-and-playback devices in hard-disk drives and like apparatus. "Fluid-dynamic-pressure bearings" are bearings in which a lubricating fluid such as oil is interposed between a shaft and a sleeve, wherein fluid pressure produced in the lubricating fluid is the bearing force.

One example of a spindle motor employing conventional pressure bearings of this sort is illustrated in FIG. 1. In between the outer circumferential surface of a shaft 2 that forms a unit with a rotor 1, and the inner circumferential surface of a sleeve 3 through which the shaft 2 is passed free to rotate, this spindle motor is configured with a pair of radial bearing sections 4, 4 that are separated in the axial direction. In between the upper surface of a discoid thrust plate 5 that projects radially outward from the circumferential surface of the shaft 1 on one of its ends, and the flat surface of a step recessed into the sleeve 3, as well as in between the undersurface of the thrust plate 5 and a thrust bush 6 that closes off one of the openings in the sleeve 3, the motor is also configured with a pair of respective thrust bearing sections 7, 7.

A single, continuous micro-gap is formed in between the shaft 2 and thrust plate 5, and the sleeve 3 and thrust bush 6. Oil 9 as a lubricating fluid is retained continuously without interruption through the course of the micro-gap. (This sort of oil-retaining structure will be denoted a "full-filled structure" hereinafter.)

Herringbone grooves 41, 41 and 71, 71 are formed in the radial bearing sections 4, 4 and the thrust bearing sections 7, 7. The herringbone grooves have a form in which pairs of spiral striations that act in mutually opposing directions are linked. In response to the rotor 1 rotating, maximum dynamic pressure is generated in the spiral-striation joints; the rotor 1 is supported by this dynamic pressure.

In a spindle motor of this sort, a taper-seal area 8 is formed alongside a portion of the sleeve 3 at its upper end, located on the motor end axially opposite the thrust bearing sections 7, 7. The oil-air interface is located in the taper-seal area 8. Because the oil has affinity for the wall surfaces of the taper-seal area, the interface is arcuate in cross-section.

Methods and apparatuses that have been proposed for charging bearing sections with the oil 9, retained as in the foregoing bearing configuration in between the thrust plate 5 and shaft 2, and the sleeve 3 and thrust bush 6, may be divided grossly into the following two methods and apparatuses.

The first method is one in which under an atmospheric-pressure environment a suitable amount of oil is put in the bearing opening, where the taper-seal area 8 or the like of the bearing unit is; the pressure is thereafter reduced to replace the air present in the bearing gap with oil; air bubbles in the oil are sufficiently discharged by leaving the bearing unit persisting a predetermined time under the reduced-pressure environment; and subsequently the environment surrounding the bearing is returned to atmospheric pressure. Japanese Pat. App. Pub. Nos. 2002-005170 and 2002-174242 are examples of prior art based on this method.

An example of the second method is: putting an oil pool and the bearings under a reduced-pressure environment from the start; under the reduced-pressure environment, putting a suitable amount of oil in the bearing opening, where the taper-seal area 8 or the like of the bearing unit is; exploiting capillary action to introduce the oil into the bearing interior; and thereafter returning the environment surrounding the bearing to atmospheric pressure. U.S. Pat. No. 5,524,729 and Japanese Pat. App. Pub. No. 2002-174243 are examples of prior literature pertaining to this method.

Nevertheless, there are problems such as the following with oil-charging methods as described above.

With the foregoing first oil-charging method, because the oil put in the taper-seal area 8 covers over the bearing opening, during the subsequent pressure reduction the air that had filled the bearing gap turns into air bubbles and passes into the oil. Under the circumstances, some of the oil splashes and splatters around the bearing, therefore making a process step of wiping up the splashes imperative. Because the wiping-up step is directly linked to rise in manufacturing cost, this method is not preferred. In some cases, moreover, if there is a threaded hole or the like in the vicinity of the bearing opening, the spattered oil invades the threads, making wipe-up impossible. Cases where the fluid-dynamic-pressure bearings have the structure given herein mean that this first oil-charging method cannot be used.

What is more, in the prior literature involving the first method, nothing is set forth regarding a way to adjust the amount of oil put in the just-noted bearing opening so as to be the appropriate amount. Consequently, those who would like to put this technology into practice have to devise on their own a method of making the quantity of oil put in the bearing opening be the appropriate amount.

With the second oil-charging method on the other hand, the fact that the oil has to be injected into the bearings under a vacuum environment means that compared with cases where oil is injected under an atmosphere environment the work is far and away more complicated, wherein finely accurate control of the injection volume is difficult. Incidents of oil leakage and shortening of bearing lifespan that originate in the amount of oil being too much or too little are therefore difficult to keep adequately under control.

Where fluid-dynamic-pressure bearings of the full-filled type are utilized in motors for 3.5-inch or server-class hard disk drives, moreover, with the journal length being longer the volume of oil retained in the fluid-dynamic-pressure bearings will thus increase. The amount of oil to be charged into the bearings in such cases is sometimes greater than the capacity of the taper-seal area provided in the bearing end portion. Likewise, in recent years fluid-dynamic-pressure bearings utilizing sintered, oil-impregnated metals have appeared on the market in motors for hard-disk drives, but the fact that therein a section of the motor sleeve is composed of a porous, sintered metal substance means that the amount of oil to be injected is extremely large, exceeding the capacity of the taper-seal area. In such cases the requisite amount of oil consequently cannot be charged into the bearings using either of the techniques described above-the first method or the second method.

An additional problem is that during volume production, with the individual fluid-dynamic-pressure bearings that are assembled not being identical, dimensional fluctuations will be present in the close-tolerance portions of the bearings, and therefore the optimal amount of oil with which they should be charged will vary subtly. If the oil fill volume is set to what fits design specifications ("preestablished oil volume" hereinafter) and all products are filled with the preestablished oil volume in one-time fillings, products that result in oil-volume excesses or shortfalls will be produced. In other words, with certain products, because the amount of oil that is injected will be less than the optimal oil volume that the bearings intrinsically should retain, after the products are assembled as motors the lifespan of the motors will prove to be shorter than the designed duration. With other products, because the amount of oil will be greater than is optimal, when the products are built into a motor there is a chance that oil leaks will develop when the motor is spun.

SUMMARY OF INVENTION

An object of the present invention is to render a method of manufacturing fluid-dynamic-pressure bearings of the full-filled type that enables accurately charging the bearings with a preestablished volume of oil. Another object of the present invention is furthermore to render a method of manufacturing fluid-dynamic-pressure bearings of the full-filled type that by excluding process steps that involve worker intervention enables charging the bearings with a preestablished volume of oil more economically and easily.

In order to achieve these objectives, in a manufacturing method of the present invention charging of oil into a bearing gap under a reduced-pressure environment is carried out divided into two cycles or more, and a pressure-restoring operation is carried out following each injection operation-all together two or more times. A pressure-reduction step may be intercalated in the course of these multiple-cycle injection and pressure-restoration steps, to keep the air introduced into the vacuum chamber by the pressure-restoring operation from entering into the bearing gap.

As given by this manufacturing method, because the amount of oil that is injected at one time can be reduced by dividing the oil charging into two or more cycles, oil enters the bearing interior smoothly replacing residual air bubbles, which keeps incidents of splashing oil that follow on the bursting of air bubbles under control. This enables omitting or otherwise simplifying the manpower-expending process step of wiping up oil splashes. Consecutive to the injection operation running, partial air is introduced into the vacuum chamber (pressure-restoring operation), which applies pressure to the injected oil, forcing it into the interior of the bearing gap.

The fact that the injection operation is performed a number of times also enables the overall fill volume to be increased. Moreover, even in cases in which the oil fill volume exceeds the containable capacity of the taper seal area, performing the injection operation several or more times makes it possible to charge the requisite amount of oil into the bearings. The effectiveness of this is especially beneficial in cases where an oil-impregnable porous substance such as a sintered metal is utilized for the fluid-dynamic-pressure bearing sleeve-because the amount of oil that has to be charged into such bearings proves to be particularly large.

As another aspect of the method by the present invention, a surplus amount of oil may be injected during the injection work, and the excess oil injected beyond a preestablished value may be removed with an oil-removing means.

As given by this aspect, even in cases where the volume of oil injected is increased, going beyond what the bearings are designed for, the fact that by the manufacturing method of the present invention oil can be removed from the taper-seal area facilitates controlling the oil fill volume. Negative impact, such as leaking oil, associated with oil surplusage can be averted.

What is more, utilizing the method according to the present invention in either of the aspects described above facilitates charging the optimal amount of oil into fluid-dynamic-pressure bearings when batch-produced.

Generally speaking, mass-produced fluid-dynamic-pressure bearings as products individually cannot be perfectly identical; they will have irregularities stemming from process discrepancies. Consequently, the optimal amount of oil that should be charged into each product will vary ever so slightly from product to product. With the manufacturing of the present invention, once the oil has been injected, by then checking the injection volume and thereupon supplementing it if there is a shortfall, or removing the excess portion from the taper-seal area if there is a surplus, occurrences of bad lots where the volume of oil filled proves to be too little, and bad lots where it proves to be overcharged, can be averted.

From the following detailed description in conjunction with the accompanying drawings, the foregoing and other objects, features, aspects and advantages of the present invention will become readily apparent to those skilled in the art.

DETAILED DESCRIPTION

Figure 1:
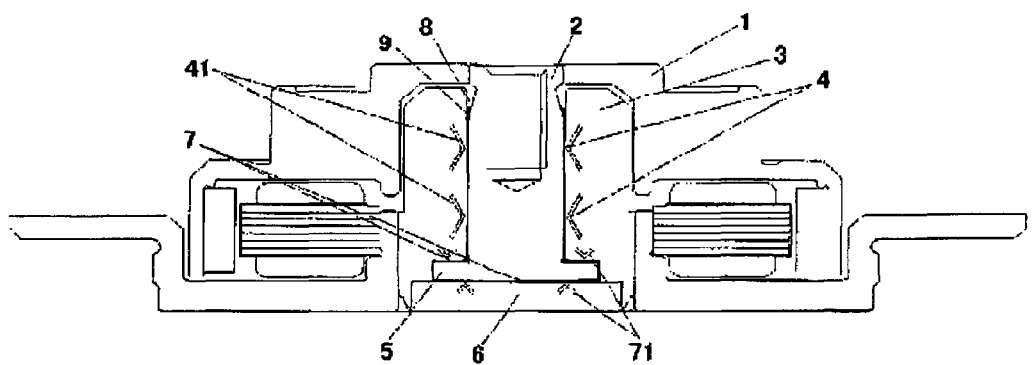
FIG. 1 is a configurational diagram of a motor having fluid-dynamic-pressure bearings.
Figure 2:
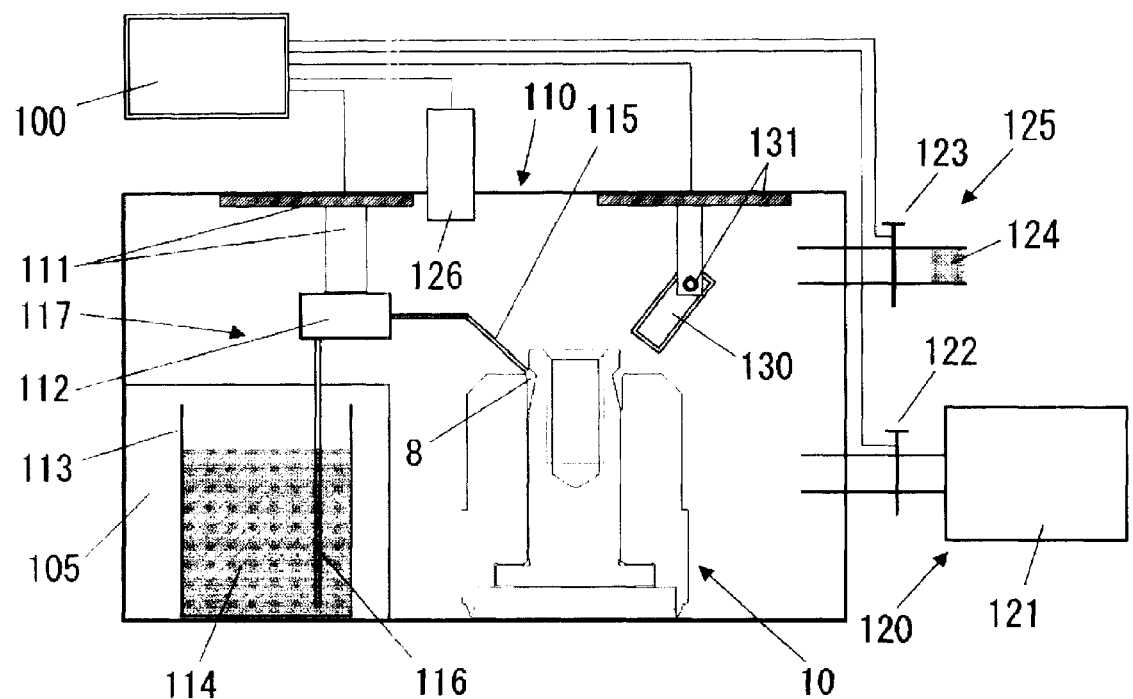
FIG. 2 is a configurational diagram of an oil-charging apparatus corresponding to a first embodiment of the present invention.
Figure 3:
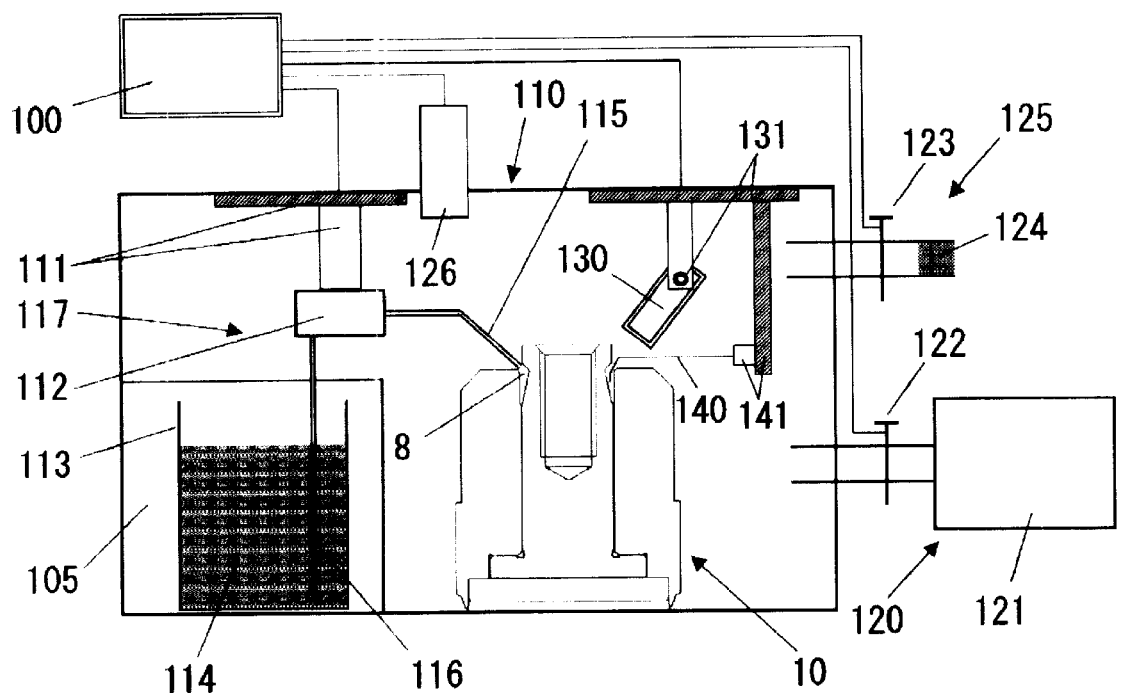
FIG. 3 is a configurational diagram of an oil-charging apparatus, corresponding to a second embodiment, equipped with an oil-suction nozzle.

Reference is made to FIGS. 2 and 3, configurational diagrams of oil-charging apparatuses that are embodiments of the present invention. Using these configurational diagrams, explanation of bearing manufacturing methods and manufacturing apparatuses based on oil fill according to the present invention will be made below.

First Embodiment

In the first embodiment, by carrying out oil injection and pressurization steps in two respective cycles, or more than that, the optimal amount of oil for the bearings is charged into them precisely and stably.

At first an oil-unfilled bearing unit 10 is inserted into a vacuum chamber 110 through a not-illustrated port in one of its side walls, and is set in place in a predetermined position within the vacuum chamber 110; the port is closed and the chamber is evacuated. In evacuating the chamber a leak valve 123 that makes up part of a gas-introducing mechanism 125 is closed, and the chamber is evacuated by an evacuating means 120. The evacuating means 120 is constituted from a rotary pump 121 and a valve 122; evacuation is controlled on/off by opening and closing the valve 122.

During evacuation pressure is monitored with a vacuum gauge 126, and after it reaches a first gas pressure P1 that has been determined in advance, the oil injection work is begun with the evacuation going on unaltered. When the bearing unit 10 is being disposed into its predetermined position, a locating mechanism 111 is utilized beforehand to position the tip part of an oil-injection nozzle 115 so that it is located directly over the taper-seal area 8 of the bearing unit 10.

An oil-supplying mechanism 117 composed of an oil reservoir 113, an oil aspiration tube 116, a needle valve 112 (for example a BP-107D or the like made by Ace Giken Co., Ltd. is used) is connected to the oil-injection nozzle 115. The oil 114 collected in the reservoir 113 is configured so that by means of the needle valve 112 a preset volume V1 will be precisely supplied to the injection nozzle 115 and injected into the taper-seal area 8.

The oil reservoir 113 is disposed inside a reserve pressure compartment 105 within the vacuum chamber 110. The pressure in the reserve pressure compartment 105 is drawn down through separate, not-illustrated piping, and during oil injection is controlled so that the acting pressure is some 1000 Pa greater than the pressure external to the pressure compartment 105, or else higher still than that. In so doing, gas pressure acts on the surface of the oil 114, producing a secure inflow of oil into the needle valve 112.

In an apparatus configured as described above, in a first step according to the present invention the inside of the vacuum chamber 110 is evacuated to reduce the environment surrounding the bearing unit 10 down to the first gas pressure P1 or less, and then is left that way for a predetermined time T1 while the evacuation is continued. The first gas pressure P1 may be at the 1000 Pa level, but is better being 10 Pa in order to secure more reliable evacuation. Ten seconds is one standard for the predetermined time T1, but if the bearing structure is complex it may be 15 seconds or more. It is possible, nonetheless, to omit the procedure of leaving the oil-unfilled bearing unit for the predetermined time T1 under the environment in which the gas pressure is P1 or less.

The first step continues with the first volume V1 of oil being injected through the tip end of the oil-injection nozzle 115 into the taper-seal area 8, and ends there.

In advance of the second step, initially the valve 122 that is a constituent of the evacuating means 120 is closed to bring the evacuation to a stop. Next the gas-introducing mechanism 125 is activated to bring the gas pressure within the vacuum chamber to a second gas pressure P2 higher than what it had been just before. A filter 124 that in addition to the leak valve 123 is a component of the gas-introducing mechanism 125 removes dust contained in the introduced air. This elevation in pressure forces the injection volume V1 of oil into the interior of the bearing gap.

Next the fill status of the injected oil is observed using a camera 130. By parallel-shifting and rotating the camera 130, it is set beforehand into a position from which the interior of the taper-seal area 8 may be observed. In cases where the size and structure of the bearing unit 10 change, the place into which the camera 130 is set has to be altered in accordance with the changes.

Based on the observation results, a second volume V2 of oil, which is the additional amount required for filling the bearing part of the bearing unit 10 with the optimal amount of oil, is determined. The second volume V2 of oil is then precisely drawn up from the oil reservoir 114 with the needle valve 112, supplied to the oil-injection nozzle 115 and injected into the taper-seal area 8, whereupon the second step finishes.

Following the conclusion of the second step, a pressure restoration step is implemented. The gas-introducing mechanism 125 is again activated to restore the pressure in the vacuum chamber 110 interior to atmospheric pressure. This operation forces throughout the bearing gap the second volume V2 of oil that had been in the taper-seal area 8, which completes the job of charging oil into the bearing unit 10.

The bearing unit 10 in which oil charging has in this way been completed is conveyed out to the vacuum chamber 110 exterior through the not-illustrated port.

Here, a control unit 100 controls these series of processes. The control unit 100, which is in control of a not-illustrated valve driving mechanism, is also in control of the opening/closing of the valve 122 and the needle valve 123. The control unit 100 furthermore monitors the reading that the vacuum gauge 126 indicates, and performs control functions based on the reading. For example, in injecting the first volume of oil, at the point in time where the first gas pressure P1 is underrun, or else after it is underrun, after continuing the vacuum-discharging for a further 10 seconds, the control unit 10 gives out an actuating instruction to the needle valve 112.

The additional injection volume V2 for the bearing unit may be determined manually based on pictorial observation with the camera 130, or may be determined automatically, based on the results of performing a predetermined graphic process on the camera picture. Alternatively, to what extent oil has been filled may be checked utilizing a non-contact liquid-level gauge instead of a camera.

Likewise, although a general Pirani gauge can be employed as the vacuum gauge 126, in order to measure pressures of 1000 Pa and above a vacuum gauge that can gauge higher pressures, such as a diaphragm gauge, may be used concurrently. One such case would be, for example, where it is desired after injecting the first volume V1 of oil to raise the pressure within the vacuum chamber up to 2000 Pa and thereupon inject a second volume of oil. Pressures in this region are difficult to measure with a Pirani gauge; they can only be extrapolated from how long the leak valve 123 is open. Herein, inasmuch as utilizing the diaphragm gauge lets the 2000 Pa be gauged directly, the control unit 100, while referring to output from the gauge, can control the open/close operation of the leak valve 123, and otherwise control injection of the second volume V2 of oil.

In fluid-dynamic-pressure bearings in which the capacity of the taper-seal area 8 is sufficiently large (for example 100% or more) by comparison to the capacity of the gap portion of the bearings, the second volume V2 may be found uniformly in all cases by subtracting the first volume V1 from the preestablished oil volume. This is presumably because in bearings of this sort fluctuations in the optimal oil volume due to machining tolerances exert only slight influence on the bearing performance.

Although according to the foregoing explanation the injection of oil is performed divided into two cycles in first and second process steps, the second step may be repeated multiple times, and the injection operation repeated three cycles or more in the charging job overall. Performing three or more cycles allows fine adjustment of the oil fill volume to readily be made. Wherein the operation is thus repeated the post-injection pressurization step can moreover be omitted in injecting oil in the second and subsequent cycles. This is because with the initial oil injection and the following pressurization ordinarily completing infusion of oil into almost all portions of the bearing gap, the necessity thereafter for forced injection by pressurization diminishes.

Conversely, following the pressurization step, the gas-introducing mechanism 125 and the evacuating means 120 may be operated to momentarily reduce the pressure of the environment surrounding the bearing. The charging job thereupon continues with the implementation of the second step composed of oil injection and pressurization, or of the pressure restoration step. By doing so, the air introduced into the vacuum chamber 110 in order to pressurize it can be kept from invading the bearing interior together with the oil.

In bearings in which an oil-impregnable porous substance such as a sintered metal is employed as a material, with it often being that the amount of oil that has to be charged into the bearing surpasses the capacity of the taper-seal area, there are cases where oil injection in two or more cycles proves to be necessary. In such cases oil can be charged as given by the present invention into the bearings efficiently and with certainty.

Second Embodiment

In the second embodiment, charging oil into the bearings is carried out by a program of injecting and pressurizing a third amount of oil that is greater than the preestablished volume of oil based on the value that the bearings are designed for, and of removing a fourth volume of oil that has been injected exceeding the preestablished volume. Precise, stable oil fill is thereby realized.

In the present embodiment a device furnished with an oil removal nozzle 140 and a mechanism 141 for adjusting its position (FIG. 3) is additionally installed in the oil-charging apparatus illustrated in FIG. 2. A slender metal tube such as a syringe needle, or else a brush or the like that adsorbs and removes oil can be utilized as the oil removal nozzle 140. Cases in which the oil is to be removed not by adsorption but by aspiration require installation of an aspiration device (not illustrated) for imparting aspirating force to the removal nozzle. Likewise, cases in which the oil is to be removed by adsorption with a brush require that the position-adjusting mechanism 141 be configured so that with the vacuum chamber in a reduced-pressure state the position of the brush may be raised/lowered from without, so that in carrying out the removal work the tip of the brush can be inserted into the taper-seal area.

In doing an oil-fill job, the oil-unfilled bearing unit 10 is inserted into the vacuum chamber 110 through the (not-illustrated port) in one of its side walls, and is set in place in a predetermined position within the vacuum chamber 110. At that time, like in the first embodiment the locating mechanism 111 is adjusted to position the tip part of the oil-injection nozzle 115 directly above the taper-seal area 8 of the bearing unit 10.

The tip end of the oil removal nozzle 140 is brought, utilizing the position-adjusting mechanism 141, into line with the position where the oil level is optimal. The adjustment may be made by bending the removal nozzle itself. This means that when the aspiration device has been put into operation the oil level will drop to the position where the tip of the oil removal nozzle 140 is.

The positioning of the oil-injection nozzle 115 and the oil removal nozzle 140 may be implemented under atmospheric pressure prior to evacuation, or may be implemented post-evacuation. In the latter case the position-determining mechanisms 111 and 141 are rendered mechanisms that may be operated from without the vacuum chamber. Although mechanisms of that sort are high-priced, they are beneficial in situations requiring, ahead of oil fill, the implementation of separate process steps under a reduced-pressure environment. Here too as in Embodiment 1 the oil reservoir 113 is installed inside the reserve pressure compartment 105 within the vacuum chamber 110.

With the oil-charging apparatus being disposed in this way, in a third step of the present invention initially the port and the leak valve 123 are closed and the chamber is evacuated with the evacuating means 120. The environment surrounding the bearing unit 10 is evacuated down to a first gas pressure P1 or less, and then the evacuation is continued for a predetermined time T1. The third step continues with a third volume V3 of oil being injected through the tip end of the oil-injection nozzle 115 into the taper-seal area 8, and ends there.

Continuing into the fourth step of the embodied invention, the valve 122 that is a component of the evacuating means 120 is closed to bring the evacuation to a stop, following which the gas-introducing mechanism 125 is activated to bring the gas pressure within the vacuum chamber to a second gas pressure P2 higher than what it had been just before. The filter 124 that in addition to the leak valve 123 is a component of the gas-introducing mechanism 125 removes dust contained in the introduced air. This elevation in pressure forces the injection volume V3 of oil into the interior of the bearing gap. Subsequently a not-illustrated aspiration device is activated to remove the fourth volume of oil from the taper-seal area. It should be understood that the first gas pressure P1 and the predetermined time T1 are likewise as with P1 and T1 of the first embodiment.

In removing the fourth amount of oil, the aspiration device needs to be equipped with the capability to halt the aspiration after the fourth amount of oil alone has been aspirated. Alternatively, the mechanism to the aspiration device may one not that detects aspiration volume, but that aspirates continuously. In the latter case, the oil level is lowered to the position where the tip of the aspiration nozzle is. If the tip end of the nozzle can be positioned with a sufficient degree of precision, the fourth volume of oil injected in excess of the preestablished volume can be removed by the latter method without making a separate measurement of the amount of oil that should be removed.

The case where the volume that should be aspirated by the aspiration device is established in advance and the method of removing the fourth volume of oil is adopted requires that the fourth volume in the bearings be determined in advance of being aspirated. Determination of the aspiration volume may be carried out manually, based on pictorial observation with the camera 130, or may be determined automatically by performing a predetermined graphic process on the camera picture. Alternatively, the excess volume of oil may be measured by the utilization of a non-contact liquid-level gauge instead of a camera.

It will be appreciated that in cases where the oil is removed by aspirating, the aspiration cannot be carried out well if the pressure in the vacuum chamber interior is too low. If the aspirating mechanism is in a position higher than the nozzle tip end, at least that pressure which can force the oil up to that height must minimally be present. And in order to force out the requisite volume of oil within a practicable time period, viscous resistance has to be overcome.

Granted that, in terms of what the requisite vacuum chamber pressure should be, the difference in height between the aspirating mechanism and the nozzle tip end, and largeness of the viscous resistance will differ greatly depending on the device configuration, but with pressures less than 1000 Pa in the vacuum chamber interior, in most cases removal by aspiration cannot be carried out well. Accordingly, in cases where oil is to be removed by means of aspiration, it is necessary in advance of aspirating to bring the pressure in the vacuum chamber 110 interior up to, or beyond, 1000 Pa.

The oil injection volume V3 mentioned earlier is desirably an amount that is at least 2% greater than the preestablished volume that is based on the value the bearings are designed for. This is because fluctuations in the optimal oil volume associated with machining error ordinarily are confined to the 2% level. In order to avert oil shortfalls the more certainly, V3 more desirably is at least 5% greater than the preestablished oil volume. Then by removing, in the fourth step described above, exactly that amount of oil that turns out to be surplus, the potential negative impact from the surplusage will also be removed.

After the fourth step concludes, finally the pressure restoration step is implemented to end the serial oil-fill job. The pressure restoration step is the same process as set forth in the first embodiment; the gas-introducing mechanism 125 is activated once more to restore the pressure in the vacuum chamber 110 interior back to atmospheric pressure. The bearing unit 10 in which oil charging has in this way been completed is conveyed out to the vacuum chamber 110 exterior through the not-illustrated port.

The control unit 100 controls, in the same manner as in the first embodiment, the series of processes described above. In addition to controlling the series of valves and the oil-supplying mechanism, the control unit 100 in the second embodiment also controls oil removal. In cases where removal is by aspiration, the control unit 100 directs timing as to when the aspirating mechanism is actuated. Likewise, in cases where removal is by adsorption with a brush or the like, the control unit 100 directs timing as to when the tip end of the brush is brought down into the taper-seal area.

Other Modifications

In the foregoing, only process steps for charging oil into the single bearing unit in FIGS. 2 and 3 have been explained, but by ranging a plurality of manufacturing apparatuses like the one depicted in either FIG. 2 or FIG. 3, charging oil simultaneously into a plurality of bearing units is possible. This enables rendering a manufacturing method and manufacturing apparatus for more highly productive manufacture of high-quality fluid-dynamic-pressure bearings.

The present invention can furthermore be embodied for the charging of oil into fluid-dynamic-pressure bearings of various kinds. For example in the present embodiments, the taper-seal area 8 of the bearing unit 10 is constituted by a structure in which the outer circumferential surface of the shaft 2 is tapered, but clearly the present invention is applicable to fluid-dynamic-pressure bearings in which the form of the taper is constituted by the inner circumferential surface of the sleeve flaring, with the thickness of the shaft being uniform. This bearing configuration facilitates oil-injection status check using the camera 130, enabling oil fill that is all the more precise.

Figure 4:
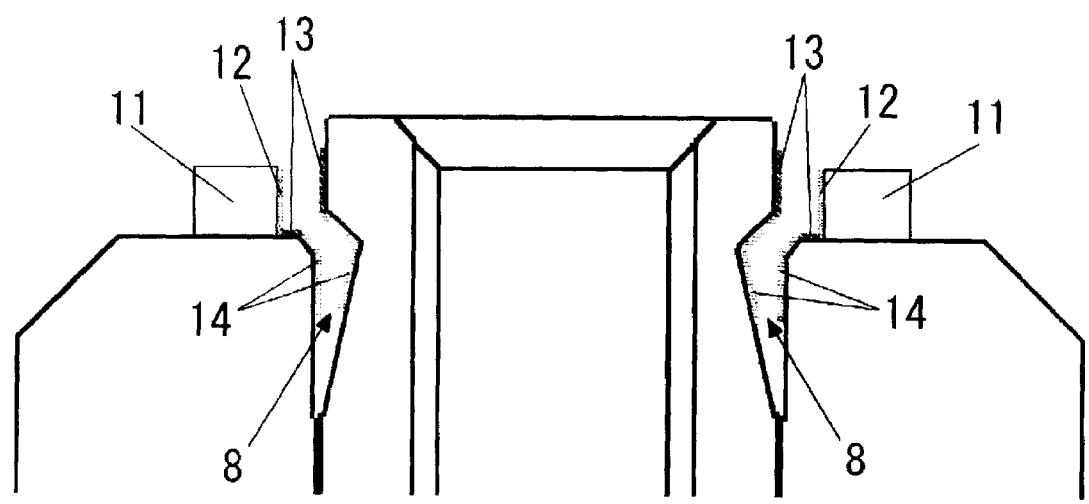
FIG. 4 is a configurational diagram of the environs of the taper-seal portion of a bearing unit in an instance where a ring member has been set in place to allow for increasing the oil-injection volume.

A further modification is, in situations where in initially injecting oil it is necessary to inject an amount that exceeds the oil capacity of the taper-seal area 8, to set a ring-shaped member 11 as depicted in FIG. 4 on the top part of the sleeve 3, and to form oil-repellant films 12 and 13 on the portions of the taper-seal area 8 and ring-shaped member 11 that the oil touches when it is being injected. This makes it possible to rid the periphery of the seal area of oil that would otherwise adhere to it and remain there following the oil injection job, which means that a wipe-up or similar step can be left out. Providing an oil-repellant film on the upper sides 14 of the taper-seal area 8 of the bearing unit 10 furthermore enables oil injection to be carried out with precision.

That is, in the first embodiment, in forcing the injected oil into the bearing clearances by pressurizing the gas pressure inside the vacuum chamber 110 to P2 after injecting the first volume of oil V1, oil remnant on the upper sides 14 of the taper-seal area 8 can be eliminated. This allows the first volume V1 of oil to be urged into the bearing clearances to enable precision oil injection.

Moreover in the second embodiment, oil removal can be carried out smoothly without oil remaining behind on the wall surfaces of the taper-seal area, thanks to the action of the oil-repellant films 14. Here again, volume-wise precision oil injection is enabled.

Hard-disk Drive

Figure 5:
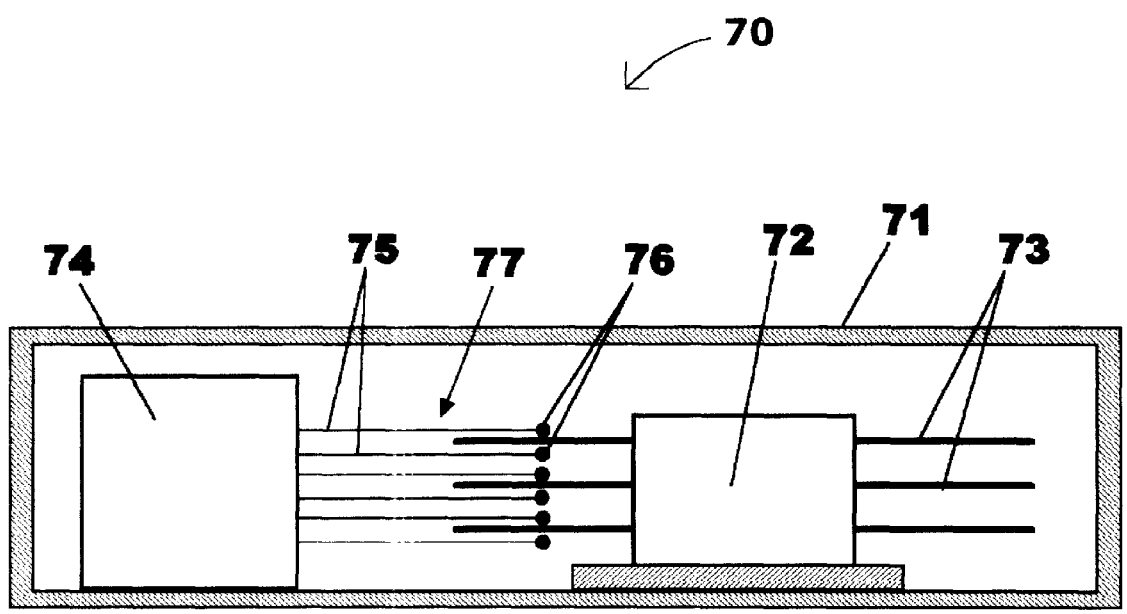
FIG. 5 is a schematic diagram of a hard-disk drive.

The internal configuration of a general disk drive 70 is represented as a schematic diagram in FIG. 5. A clean space where dust and debris are extremely slight is formed inside a housing 71, in the interior of which is installed a spindle motor 72 on which platter-shaped magnetic disks 73 for recording information are fitted. In addition, a head-shifting mechanism 77 that reads signals from and writes signals onto the magnetic disks 73 is disposed within the housing 71. The head-shifting mechanism 77 is constituted by: heads 76 that read/write information on the disks 73; arms 75 that support the heads 76; and an actuator 74 that shifts the heads 76 and arms 75 to the requisite locations over the disks 73.

Utilizing fluid-dynamic-pressure bearings manufactured according a manufacturing method set forth in the foregoing to configure the spindle motor 72, and using the motor in a hard-disk drive of the sort just described enables rendering inexpensive hard-disk drives having optimal lifespan and stable performance.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. Carried out in the manufacture of a fluid dynamic-pressure bearing unit having a shaft section including at least a shaft, and a sleeve section including at least a sleeve and a thrust bush, wherein in between the shaft section and the sleeve section a continuous oil-retaining gap including a radial bearing and/or a thrust bearing is formed, the shaft section and the sleeve section are disposed to let one rotate relative to the other with the gap intervening, and in a portion of the bearing unit in contact with air that connects the oil-retaining gap with the atmosphere a taper-seal area is formed, a method of manufacturing fluid-dynamic-pressure bearings, comprising:
    a first step including a substep (a) of, with the fluid-dynamic-pressure bearing unit not yet filled with oil, reducing the pressure of the environment surrounding the bearing unit to at least a predetermined pressure, and a substep (b) of injecting a first volume of oil into the taper-seal area of the bearing unit;
    a second step, carried out after termination of said first step, of keeping the environment surrounding the bearing unit at a pressure equal to, or pressurizing to a pressure higher than, that of the bearing unit immediately prior to said second step, then injecting a second volume of oil into the taper-seal area of the bearing unit, said second step being carried out one cycle, or a number of cycles more than that; and a pressure restoration step, carried out following termination of said second step, of restoring to atmospheric pressure the environment surrounding the bearing unit.

2. Carried out in the manufacture of a fluid-dynamic-pressure bearing unit having a shaft section including at least a shaft, and a sleeve section including at least a sleeve end a thrust bush, wherein in between the shaft section and the sleeve section a continuous oil-retaining gap including a radial bearing and/or a thrust bearing is formed, the shaft section and the sleeve section are disposed to let one rotate relative to the other with the gap intervening, and in a portion of the bearing unit in contact with air that connects the oil-retaining gap with the atmosphere a taper-seal area is formed, the bearing unit therein being designed to retain a preestablished oil volume, a method of manufacturing fluid-dynamic-pressure bearings, comprising:

a first step including a substep (a) of, with the fluid-dynamic-pressure bearing unit not yet filled with oil, reducing the pressure of the environment surrounding the bearing unit to at least a predetermined pressure, and a substep (b) of injecting into the taper-seal area of the bearing unit oil in an amount that exceeds said preestablished volume;

a second step, carried out after termination of said first step, of keeping the environment surrounding the bearing unit a pressure equal to, or pressurizing the pressure higher than, that of the bearing unit immediately prior to the second step, and of removing a surplus volume of oil from the taper-seal area to reduce to a certain volume the oil occupying the taper-seal area; and a pressure restoration step, carried out following termination of said second step, of restoring to atmospheric pressure the environment surrounding the bearing unit.

3. A method of manufacturing fluid-dynamic-pressure bearings as set forth in claim 1, further comprising:

a third step, carried out after termination of said second step, of keeping the environment surrounding the bearing unit at a pressure equal to, or pressurizing to a pressure higher than, that of the bearing unit immediately prior to said second step, and of removing a surplus volume of oil from the taper-seal area; wherein said pressure restoration step is carried out following termination of said step.

4. A method of manufacturing fluid-dynamic-pressure bearings as set forth in claim 1, wherein consecutive to any one cycle of said second step pressure reduction of the environment surrounding the bearing unit is carried out.

5. A method of manufacturing fluid-dynamic-pressure bearings as set forth in claim 1, wherein in said substep (a), the predetermined pressure is maintained for a predetermined time period.

6. A method of manufacturing fluid-dynamic-pressure bearings as set forth in claim 2, wherein in said substep (a), the predetermined pressure is maintained for a predetermined time period.

7. A method of manufacturing fluid-dynamic-pressure bearings as set forth in claim 5, wherein:

said first predetermined pressure is 100 Pa or less; and said predetermined time is 10 seconds or more.

8. A method of manufacturing fluid-dynamic-pressure bearings as set forth in claim 6, wherein:

said predetermined pressure is 100 Pa or less; and said predetermined time is 10 seconds or more.

9. A method of manufacturing fluid-dynamic-pressure bearings as set forth in claim 1, wherein at least a portion of the sleeve is composed of en oil-impregnable porous substance.

10. A method of manufacturing fluid-dynamic-pressure bearings as set forth in claim 2, wherein at least a portion of the sleeve is composed of an oil-impregnable porous substance.

11. A method of manufacturing fluid-dynamic-pressure bearings as set forth in claim 5, wherein at least a portion of the sleeve is composed of an oil-impregnable porous substance.

12. A method of manufacturing fluid-dynamic-pressure bearings as set forth in claim 6, wherein at least a portion of the sleeve is composed of an oil-impregnable porous substance.

* * * * *